US 8,229,097 B2

(12) United States Patent
Brooks et al.

(10) Patent No.: US 8,229,097 B2
(45) Date of Patent: Jul. 24, 2012

(54) ORIGINATING SIMULTANEOUS RING SERVICES

(75) Inventors: Euclid S. Brooks, Laurel, MD (US);
Jeffrey R. Evans, Lovettsville, VA (US);
Nashwa F. Sidhom, Edison, NJ (US);
Henry L. Tam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1249 days.

(21) Appl. No.: 11/962,303

(22) Filed: Dec. 21, 2007

(65) Prior Publication Data
US 2009/0161851 A1  Jun. 25, 2009

(51) Int. Cl.
*H04M 3/42* (2006.01)
(52) U.S. Cl. ............................... 379/211.04; 379/207.13

(58) Field of Classification Search ............. 379/207.13, 379/211.03, 207.02, 211.04, 201.01
See application file for complete search history.

(56) References Cited

U.S. PATENT DOCUMENTS

| | | | | |
|---|---|---|---|---|
| 7,606,357 | B2 * | 10/2009 | Daigle | 379/211.04 |
| 7,831,030 | B2 * | 11/2010 | Levy et al. | 379/211.03 |
| 2006/0093121 | A1 * | 5/2006 | Sylvain | 379/220.01 |
| 2007/0064909 | A1 * | 3/2007 | Levy et al. | 379/211.03 |
| 2010/0054441 | A1 * | 3/2010 | Daigle | 379/207.02 |

\* cited by examiner

*Primary Examiner* — Thjuan K Addy

(57) ABSTRACT

A device receives information associated with a calling party, and validates the calling party for an originating simultaneous calls service based on the calling party information. The device also receives information associated with a called party, retrieves called party destination information based on the called party information, and sends an instruction to originate two or more simultaneous calls to the called party based on the called party destination information.

25 Claims, 16 Drawing Sheets

FIG. 9

| List Name | List ID | Phone Number n=1 | ... | Phone Number n=N | No Answer Condition | Busy Condition |
|---|---|---|---|---|---|---|
| John | 01 | NPA-NXX-XXXX | ... | NPA-NXX-XXXX | Voice mail | Try again |
| Dad | 02 | NPA-NXX-XXXX | ... | NPA-NXX-XXXX | Email | Email |
| My Employee | 03 | NPA-NXX-XXXX | ... | NPA-NXX-XXXX | Text Message | Pager |
| Assistants | 04 | NPA-NXX-XXXX | ... | NPA-NXX-XXXX | Voice mail | Voice mail |

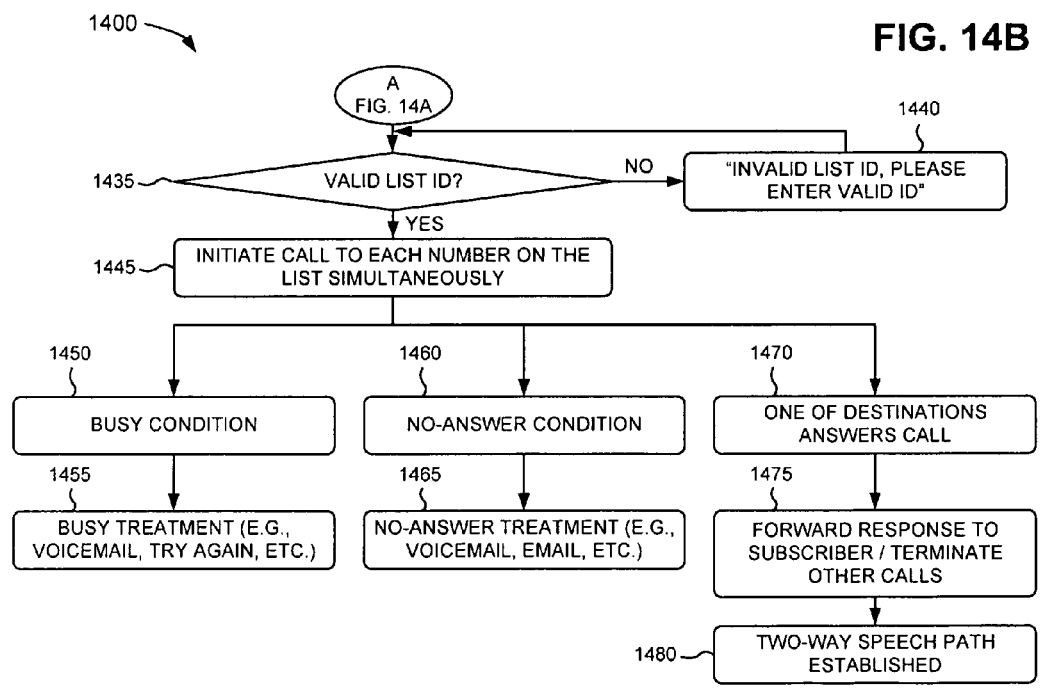

US 8,229,097 B2

ORIGINATING SIMULTANEOUS RING SERVICES

BACKGROUND

Most people today have more than one telephone number where they can be reached, such as a home telephone number, a cellular telephone number, a work telephone number, etc. In order to reach a person, a caller or calling party sometimes has to make multiple calls. For example, a calling party may unsuccessfully reach a called party at their home telephone number (e.g., the call is not answered or the number is busy), and may try to reach the called party at their cellular telephone number. If the called party is unsuccessfully reached via the cellular telephone number, the calling party may try to reach the called party at their work telephone number. Such a process is frustrating, time consuming, and costly for the calling party.

Some simultaneous ring services exist today, but such services are terminating services (i.e., initiated by a called party rather than by a calling party). These terminating services permit the called party to define how their telephones will ring. For example, a subscriber (e.g., a called party) to a terminating service can have their home and cellular telephones ring for every incoming call to their home telephone number.

BRIEF DESCRIPTION OF THE DRAWINGS

FIG. 9 depicts a portion of an exemplary calling party database capable of being managed by the service control point of the network illustrated in FIG. 1 and/or the user agent server of the network illustrated in FIG. 4.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide an originating simultaneous ring (OSR) service that may simultaneously make multiple calls for a calling party or subscriber. The OSR service may include an originating telephone feature that enables the calling party to dial multiple telephone numbers simultaneously and to connect to a first destination (e.g., a called telephone number) that answers the call. The OSR service may aid a calling party that has multiple contact telephone numbers for the same person (e.g., a home telephone number, a cellular telephone number, a work telephone number, etc.). The OSR service may permit the calling party to create a profile with lists of telephone numbers, and to assign a list name and an identification mechanism (e.g., a two-digit list identification number) to each list. Using a telephone keypad or a web-based user interface, the calling party may manage the profile and update the telephone number lists at any time. The calling party may also have the option of defining different treatments for "no-answer" and/or "busy" conditions for each list. Exemplary treatments may include leaving a voice mail message, sending an email to one or more email addresses, sending a text message to a data device (e.g., a cell phone, a personal digital assistant (PDA), etc.), trying the call again in a determined amount of time (e.g., "X" minutes), etc.

The OSR service may permit the calling party to initiate a call to one of the telephone number lists by dialing an access code and the list identification number (e.g., with a telephone), or by selecting a list name (e.g. via a web-based interface). The OSR service may be implemented via a PSTN network (e.g., using an Advanced Intelligent Network (AIN) platform), a voice over Internet Protocol (VoIP) network, and/or a cellular network (e.g., wireless Global System for Mobile Communications (GSM), wireless Code-Division Multiple Access (CDMA), etc. In contrast to existing terminating services (i.e., initiated by a called party), the OSR service may include an originating service (i.e., initiated by a calling party) that may permit a calling party to control whose telephones will ring, and may make it easy to reach a desired person with one call instead of multiple calls.

Figure 1:
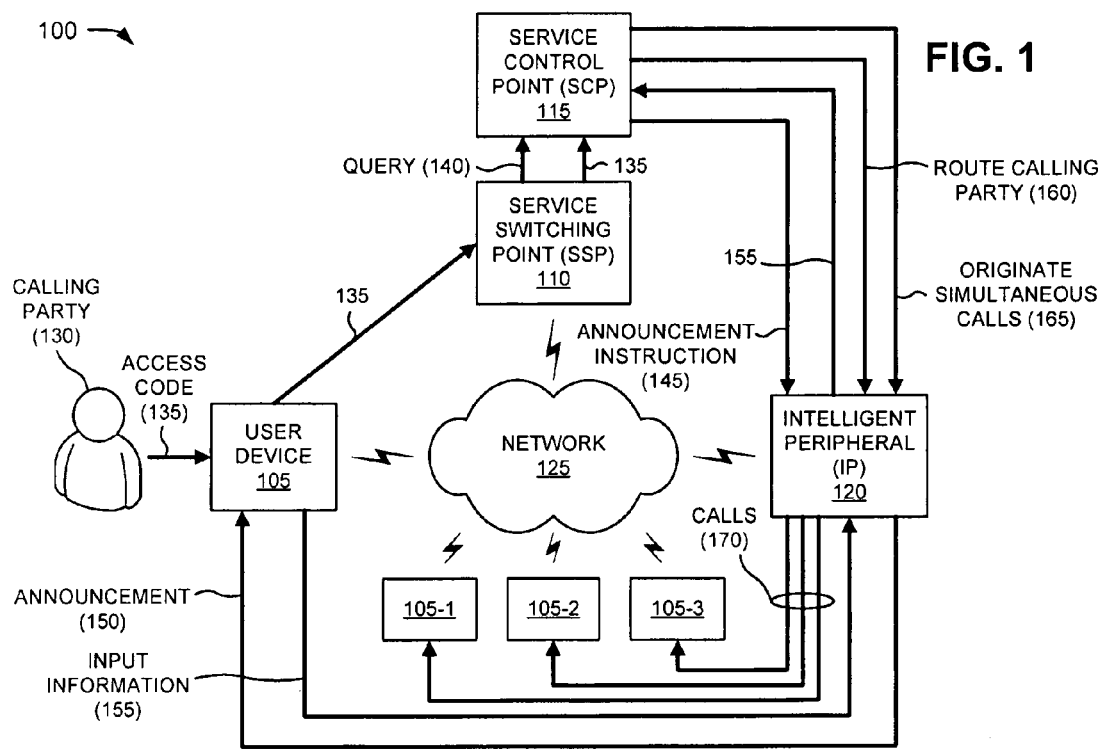
FIG. 1 is an exemplary diagram of a network in which systems and methods described herein may be implemented.

FIG. 1 is an exemplary diagram of a network 100 in which systems and methods described herein may be implemented. As illustrated, network 100 may include one or more user devices 105, 105-1, 105-2, and 105-3 (collectively referred to as "user devices 105"), a service switching point (SSP) 110, a service control point (SCP) 115, and/or an intelligent peripheral 120 interconnected by a network 125. In one implementation, network 100 may correspond to an Advanced Intelligent Network (AIN) configuration. User devices 105, SSP 110, SCP 115, and/or intelligent peripheral 120 may connect to network 125 via wired and/or wireless connections. Four user devices, a single SSP, a single SCP, a single intelligent peripheral, and a single network have been illustrated in FIG. 1 for simplicity. In practice, there may be more or less user devices, SSPs, SCPs, intelligent peripherals, and/or networks. Also, in some instances, one or more of user devices 105, SSP 110, SCP 115, and/or intelligent peripheral 120 may perform one or more functions described as being performed by another one or more of user devices 105, SSP 110, SCP 115, and/or intelligent peripheral 120.

Each of user devices 105 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or other types of computation or communication devices, threads or processes running on these devices, and/or objects executable by these devices. In one implementation, user device 105 may be associated with a calling party 130 (e.g., a subscriber to the OSR service described herein), and may provide an originating telephone feature that enables calling party 130 to dial multiple telephone numbers simultaneously and to connect to a first destination (e.g., called telephone number) that answers the call.

SSP 110 may include one or more computation or communication devices (e.g., a telephone exchange) that may initially respond to a call (e.g., when a calling party dials a number) by sending a query to a central database contained within SCP 115 so that the call can be handled. In one implementation, SSP 110 may use Signaling System 7 (SS7) protocols for call setup, call management, and/or call termination with other SSPs. SSP 110 may include software logic that permits it to suspend a call and launch a query to an external database (e.g., a database provided in SCP 115).

SCP 115 may include one or more computation or communication devices, provided in an intelligent network telephone system (e.g., network 100), which may be used to control a service. SCP 115 may be deployed using SS7, Sigtran, and/or Session Initiation Protocol (SIP) technologies. SCP 115 may communicate with intelligent peripheral 120 (e.g., to play voice messages and/or to prompt a calling party for information, such as prepaid long distance account codes). SCP 115 may prompt a calling party by requesting feature codes (e.g., an account code), and may use the feature codes to implement the OSR service described herein. In one implementation, SCP 115 may include software logic that provides the OSR service described herein, and/or a database of subscriber records and/or data. Further details of SCP 115 are provided below in connection with FIG. 2.

Intelligent peripheral 120 may include one or more computation or communication devices that may provide resources such as customized and/or concatenated voice announcements, voice recognition, and/or dual-tone multi-frequencies (DTMF) digit collection. In one implementation, intelligent peripheral 120 may include a switching matrix to connect users to these resources. Intelligent peripheral 120 may support flexible information interactions between an end user and a network (e.g., network 100). Intelligent peripheral 120 may include resource management capabilities that search for idle resources, initiate those resources, and/or return the resources to their idle state. Further details of intelligent peripheral 120 are provided below in connection with FIG. 3.

Network 125 may include an Advanced Intelligent Network (AIN) (e.g., a telephone network architecture that may separate service logic from switching equipment, and may allow new services to be added without having to redesign switches to support the new services), a local area network (LAN), a wide area network (WAN), a metropolitan area network (MAN), an intranet, the Internet, a Public Land Mobile Network (PLMN), a telephone network, such as the PSTN or a cellular telephone network, or a combination of networks. In one exemplary implementation, the OSR service described herein may be implemented using an AIN-based platform provided on a PSTN network.

As further shown in FIG. 1, to originate simultaneous calls with the OSR service, calling party 130 may dial an access code 135 (or use some other verification mechanism, such as voice recognition) via his/her user device 105. User device 105 may provide access code 135 to SSP 110, and SSP 110 may suspend call processing and may generate a query 140 based on access code 135. SSP 110 may provide access code 135 and/or query 140 to SCP 115 for execution. SCP 115 may receive access code 135 and/or query 140, and may execute query 140 on a database of subscriber records to verify or validate that calling party 130 subscribes to the OSR service. For example, in one implementation, the database of subscriber records may include a list of access codes for subscribers to the OSR service. If access code 135 matches an access code provided in the list of access codes, SCP 115 may retrieve records associated with calling party 130. For example, SCP 115 may retrieve a calling party database that includes names of people that may be called by calling party 130 using the OSR service, identification mechanisms associated with the names, multiple telephone numbers associated with the names, "no-answer" conditions associated with the names, "busy" conditions associated with the names, etc. Further details of the calling party database are provided below in connection with FIG. 9.

As further shown in FIG. 1, SCP 115 may provide an instruction 145 to intelligent peripheral 120 to play an announcement that may prompt calling party 130 to input an identification mechanism (e.g., a two-digit list identification) for a person or group that calling party 130 wishes to dial with the OSR service. In response, intelligent peripheral 120 may play an announcement 150 (e.g., requesting an identification mechanism) for calling party 130 (e.g., via user device 105), and calling party 130 may provide input information 155 (e.g., a list identification) to intelligent peripheral 120 (e.g., via user device 105). Intelligent peripheral 120 may provide input information 155 to SCP 115. If calling party 130 enters a valid list identification 155 (e.g., via user device 105), SCP 115 may route calling party 130 to intelligent peripheral 120, as indicated by reference number 160, and may provide an instruction 165 to intelligent peripheral 120 to simultaneously initiate a call to each telephone number associated with input information 155. For example, if calling party 130 enters input information 155 associated with a friend named John, SCP 115 may provide instruction 165 to intelligent peripheral 120 to simultaneously initiate calls to John's work telephone number, home telephone number, and/or cell telephone number.

As shown in FIG. 1, intelligent peripheral 120 may originate simultaneous calls 170 to multiple destinations (e.g., user devices 105-1, 105-2, and/or 105-3) associated with input information 155. If the called party (e.g., John) answers one of user devices 105-1, 105-2, and/or 105-3, intelligent peripheral 120 may bridge calling party 130 to a destination (e.g., the answering one of user devices 105-1, 105-2, and/or 105-3) associated with the called party, and may stop ringing the non-answering user devices (e.g., two of user devices 105-1, 105-2, and/or 105-3). A connection may be established between calling party 130 and the destination (e.g., the called party).

If simultaneous calls 170 are not answered by user devices 105-1, 105-2, and/or 105-3 after a number of rings or encounter busy lines, SCP 115 may execute an action defined (e.g., in the called party database) for a "no-answer" condition or a "busy" condition. For example, SCP 115 may forward the call to voice mail if the call was not answered after a predefined number of rings. In another example, SCP 115 may continue to ring the other telephone numbers associated with input information 155 if one of the lines is busy.

In one exemplary implementation, the OSR service may be used if calling party 130 wants to reach any one person from a group of several people. For example, a manager with multiple people reporting to him/her may define a list (e.g., "My Employees" list) within the database of subscriber records. If there is a need to reach any one of his/her employees, the manager may use the OSR service to call his/her list of employees, and may connect to the first employee who answers the call. In another example, a person may have two or more assistants and may create a list with his/her assistants' telephone numbers. The person may reach any one of the assistants by making one call with the OSR service, and the OSR service may place simultaneous calls to the assistants.

Figure 2:
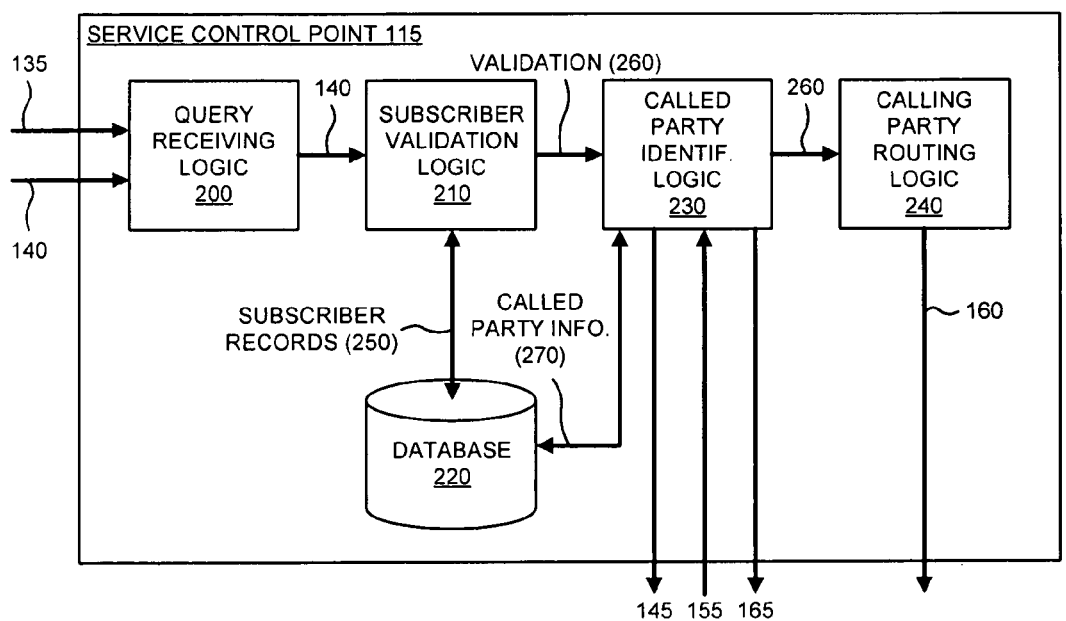
FIG. 2 depicts an exemplary functional block diagram of a service control point of the network illustrated in FIG. 1.

FIG. 2 depicts an exemplary functional block diagram of SCP 115. As illustrated, SCP 115 may include query receiving logic 200, subscriber validation logic 210, a database 220, called party identification logic 230, and/or calling party routing logic 240.

Query receiving logic 200 may include any hardware and/or software based logic that enables SCP 115 to receive access code 135 and/or query 140 from SSP 110, and to execute query 140 on a database of subscriber records. In one implementation, query receiving logic 200 may receive access code 135 and query 140, and may provide query 140 to subscriber validation logic 210 for execution on database 220.

Subscriber validation logic 210 may include any hardware and/or software based logic that enables SCP 115 to execute query 140 on a database of subscriber records (e.g., database 220) to verify or validate that calling party 130 subscribes to the OSR service. In one implementation, subscriber validation logic 210 may receive query 140 from query receiving logic 200, and may execute query 140 on subscriber records 250 (e.g., a list of access codes for subscribers to the OSR service) provided in database 220 in order to validate that calling party subscribes to the OSR service. If access code 135 matches an access code provided in the list of access codes, subscriber validation logic 210 may determine that calling party 130 is validated, and may provide a validation 260 of calling party 130 to called party identification logic 230.

Database 220 may include one or more databases capable of being provided in SCP 115 (e.g., within a storage device) and/or managed by SCP 115. In one implementation, database 220 may be provided in a device separate from SCP 115, and may be accessed by SCP 115. The information provided in database 220 may be provided by any device in network 100, and/or by any device provided in a network separate from network 100. Database 220 may include a variety of information, such as subscriber records used to verify or validate that calling party 130 subscribes to the OSR service, a list of access codes for subscribers to the OSR service, names of people that may be called by calling party 130 using the OSR service, identification mechanisms associated with the names, multiple telephone numbers associated with the names, "no-answer" conditions associated with the names, "busy" conditions associated with the names, etc.

Called party identification logic 230 may include any hardware and/or software based logic that enables SCP 115 to retrieve records associated with calling party 130. In one implementation, called party identification logic 230 may receive validation 260, and may retrieve called party information 270 (e.g., names of people that may be called by calling party 130 using the OSR service, identification mechanisms associated with the names, multiple telephone numbers associated with the names, "no-answer" conditions associated with the names, "busy" conditions associated with the names, etc.) from database 220. Called party identification logic 230 may provide announcement instruction 145 to intelligent peripheral 120, and may receive input information 155 (e.g., a list identification) from intelligent peripheral 120. If calling party 130 enters a valid list identification 155, called party identification logic 230 may provide instruction 165 to intelligent peripheral 120 to simultaneously initiate a call to each telephone number associated with input information 155. Called party identification logic 230 may provide validation 260 to calling party routing logic 240.

Calling party routing logic 240 may include any hardware and/or software based logic that enables SCP 115 to route calling party 130 to intelligent peripheral 120. In one implementation, calling party routing logic 240 may receive validation 260 from called party identification logic 230. If calling party 130 enters a valid list identification 155, calling party routing logic 240 may route calling party 130 to intelligent peripheral 120, as indicated by reference number 160.

Although FIG. 2 shows exemplary functional components of SCP 115, in other implementations, SCP 115 may contain fewer, different, or additional functional components than depicted in FIG. 2. In still other implementations, one or more functional components of SCP 115 may perform one or more other tasks described as being performed by one or more other functional components of SCP 115.

Figure 3:
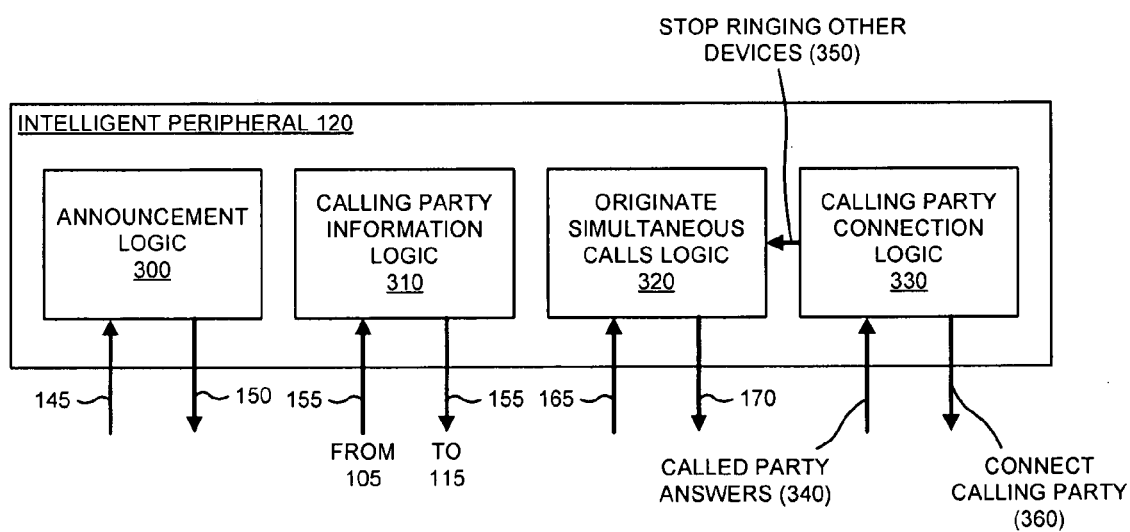
FIG. 3 illustrates an exemplary functional block diagram of an intelligent peripheral of the network depicted in FIG. 1.

FIG. 3 illustrates an exemplary functional block diagram of intelligent peripheral 120. As illustrated, intelligent peripheral 120 may include announcement logic 300, calling party information logic 310, originate simultaneous calls logic 320, and/or calling party connection logic 330.

Announcement logic 300 may include any hardware and/or software based logic that enables intelligent peripheral 120 to play an announcement that may prompt calling party 130 to input an identification mechanism (e.g., a two-digit list identification) for a person or group that calling party 130 wishes to dial with the OSR service. In one implementation, announcement logic 300 may receive instruction 145 (e.g. from SCP 115) to play an announcement that may prompt calling party 130 to input an identification mechanism for a person or group calling party 130 wishes to dial with the OSR service. In response, announcement logic 300 may play announcement 150 (e.g., requesting an identification mechanism) for calling party 130 (e.g., via user device 105).

Calling party information logic 310 may include any hardware and/or software based logic that enables intelligent peripheral 120 to provide input information 155 (e.g., in response to announcement 150) to SCP 115. In one implementation, calling party information logic 310 may receive input information 155 (e.g., a list identification) from user device 105 (e.g., in response to announcement 150), and may provide input information 155 to SCP 115.

Originate simultaneous calls logic 320 may include any hardware and/or software based logic that enables intelligent peripheral 120 to originate simultaneous calls 170 to multiple destinations associated with input information 155. In one implementation, originate simultaneous calls logic 320 may receive instruction 165 to simultaneously initiate calls to multiple destinations, and may originate simultaneous calls 170 to multiple destinations (e.g., user devices 105-1, 105-2, and/or 105-3) associated with input information 155.

Calling party connection logic 330 may include any hardware and/or software based logic that enables intelligent peripheral 120 to connect calling party 130 to a destination answering one of the simultaneous calls. In one implementation, if the called party answers one of user devices 105-1, 105-2, and/or 105-3 (e.g., as indicated by reference number 340), calling party connection logic 330 may receive indication 340 that the called party answered, and may stop ringing the non-answering user devices (e.g., two of user devices 105-1, 105-2, and/or 105-3), as indicated by reference number 350. Calling party connection logic 330 may bridge calling party 130 to a destination (e.g., the answering one of user devices 105-1, 105-2, and/or 105-3) associated with the called party (e.g., as indicated by reference number 360), and a connection may be established between calling party 130 and the destination (e.g., the called party).

Although FIG. 3 shows exemplary functional components of intelligent peripheral 120, in other implementations, intelligent peripheral 120 may contain fewer, different, or additional functional components than depicted in FIG. 3. In still other implementations, one or more functional components of intelligent peripheral 120 may perform one or more other tasks described as being performed by one or more other functional components of intelligent peripheral 120.

Figure 4:
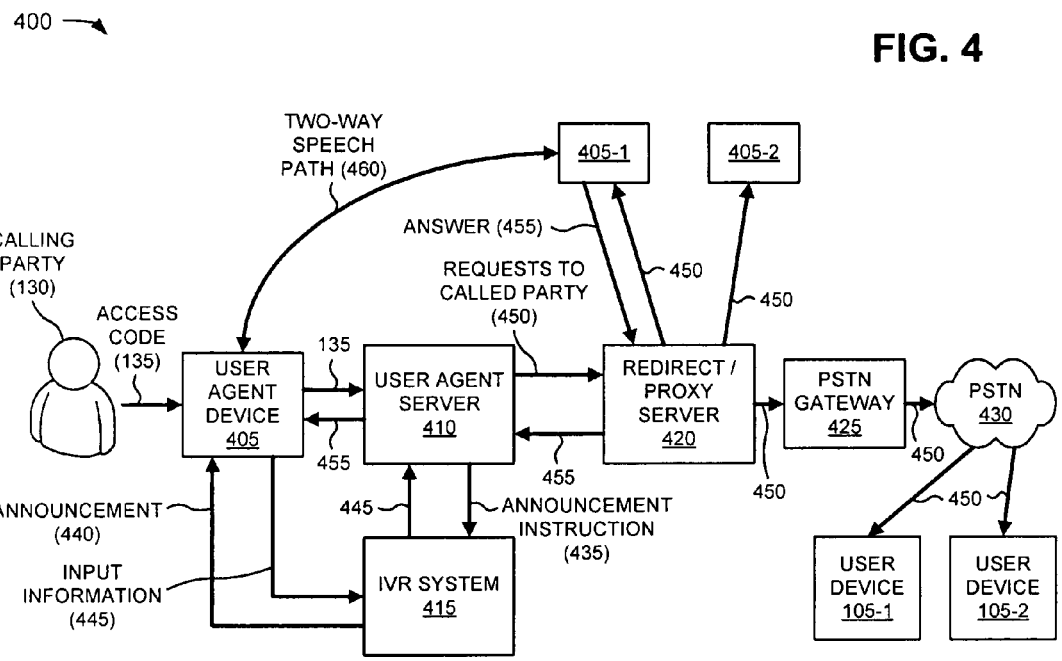
FIG. 4 is an exemplary diagram of another network in which systems and methods described herein may be implemented.

FIG. 4 is an exemplary diagram of another network 400 in which systems and methods described herein may be implemented. As illustrated, network 400 may include one or more user devices 105-1 and 105-2, one or more user agent devices 405, 405-1, and 405-2 (collectively referred to as "user agent devices 405"), a user agent server 410, an interactive voice response (IVR) system 415, a redirect and/or proxy server 420, a PSTN gateway 425, and/or a PSTN network 430. In one implementation, network 400 may correspond to a VoIP configuration (e.g., implemented with session initiation protocol (SIP), International Telecommunication Union (ITU) H.323 protocol, etc.). Although not shown in FIG. 4, one or more components of network 400 may be interconnected by a network (e.g., a LAN, a WAN, a MAN, an intranet, the Internet, a PLMN, a cellular telephone network, or a combination of networks). User devices 105, user agent devices 405, user agent server 410, IVR system 415, redirect/proxy server 420, PSTN gateway 425, and/or PSTN network 430 may connect to the network (not shown) via wired and/or wireless connections. Two user devices, three user agent devices, a single user agent server, a single IVR system, a single redirect/proxy server, a single PSTN gateway, and a single PSTN network have been illustrated in FIG. 4 for simplicity. In practice, there may be more or less user devices, user agent devices, user agent servers, IVR systems, redirect/proxy servers, PSTN gateways, and/or PSTN networks. Also, in some instances, one or more of user devices 105, user agent devices 405, user agent server 410, IVR system 415, redirect/proxy server 420, and/or PSTN gateway 425 may perform one or more functions described as being performed by another one or more of user devices 105, user agent devices 405, user agent server 410, IVR system 415, redirect/proxy server 420, and/or PSTN gateway 425.

Each of user devices 105 may include the configurations and functions described above in connection with FIG. 1.

Each of user agent devices 405 may include a logical entity that may create a new request (e.g., a SIP request), and may send the request. For example, each of user agent devices 405 may include a radiotelephone, a PCS terminal, a PDA, a laptop, a personal computer, a VoIP-based device, or other types of computation or communication devices, threads or processes running on these devices, and/or objects executable by these devices. In one implementation, user agent device 405 may be associated with calling party 130 (e.g., a subscriber to the OSR service described herein), and may provide an originating telephone feature that enables calling party 130 to dial multiple telephone numbers simultaneously and to connect to a first destination (e.g., called telephone number) that answers the call.

User agent server 410 may include one or more computation or communication devices that may generate a response (e.g., reject, accept, redirect, etc.) to a SIP request, e.g., from user agent device 405. In one implementation, user agent server 410 may communicate with IVR system 415 (e.g., to play voice messages and/or to prompt a calling party for information). User agent server 410 may prompt a calling party (e.g., via IVR system 415) by requesting feature codes (e.g., an account code or an access code), and may use the feature codes to implement the OSR service described herein. User agent server 410 may include software logic that provides the OSR service described herein, and/or a database of subscriber records and/or data. Further details of user agent server 410 are provided below in connection with FIG. 5.

IVR system 415 may include one or more computation or communication devices that may allow a user, typically a telephone caller, to select an option from a voice menu or otherwise interface with a computer system. IVR system 415 may play pre-recorded voice prompts to which the user may respond by either pressing a number on a telephone keypad or by speaking to the system. In one implementation, IVR system 415 may playback announcements (e.g., if certain conditions are encountered) to prompt calling party 130 to provide requested information. Further details of IVR system 415 are provided below in connection with FIG. 6.

Redirect/proxy server 420 may include one or more redirect servers that may generate responses to requests (e.g., SIP requests), and may direct the requests to an alternate set of Uniform Resource Identifiers (URIs). Alternatively and/or additionally, redirect/proxy server 420 may include one or more proxy servers that may act as a server and a client for purposes of making request on behalf of other clients, and may route requests (e.g., SIP requests) to another entity closer to a targeted user. In one implementation, redirect/proxy server 420 may forward simultaneous called party requests to multiple destinations (e.g., user agent devices 405-1 and 405-2, user devices 105-1 and 105-2, etc.). Further details of redirect/proxy server 420 are provided below in connection with FIG. 7.

PSTN gateway 425 may include a network device, a data transfer device (e.g., a gateway, a router, a switch, a firewall, a network interface card (NIC), a hub, a bridge, a proxy server, or some other type of device that processes and/or transfers data), etc. In one example, PSTN gateway device 425 may be capable of converting voice and/or facsimile information, in real time, between PSTN network 430 and an IP network (e.g., a network that includes user agent device 405, user agent server 410, IVR system 415, and/or redirect/proxy server 420).

PSTN network 425 may include a telephone network, such as the PSTN or a cellular telephone network, or a combination of networks.

As further shown in FIG. 4, to originate a simultaneous call with the OSR service, calling party 130 may dial access code 135 (or use some other verification mechanism, such as a username and/or password) via his/her user agent device 405. In one implementation, calling party 130 may have an account (e.g., for OSR services) that is registered with user agent server 410 and contains information associated with a profile of calling party 130. User agent server 410 may request that user agent device 405 (e.g., associated with calling party 130) be registered in order to originate simultaneous calls.

Returning to FIG. 4, user agent device 405 may provide access code 135 to user agent server 410. For example, calling party 130 may dial access code 135 via a key pad of user agent device 405, and user agent device 405 may send a request to user agent server 410. User agent server 410 may receive access code 135 and/or the request, and may determine whether the OSR service is activated for calling party 130 based on a comparison with a database of subscriber records. For example, in one implementation, the database of subscriber records may include a list of access codes for subscribers to the OSR service. If access code 135 matches an access code provided in the list of access codes, user agent server 410 may retrieve records associated with calling party 130. For example, user agent server 410 may retrieve a calling party database that includes names of people that may be called by calling party 130 using the OSR service, identification mechanisms associated with the names, multiple telephone numbers associated with the names, "no-answer" conditions associated with the names, "busy" conditions associated with the names, etc. Further details of the calling party database are provided below in connection with FIG. 9.

As further shown in FIG. 4, user agent server 410 may provide an instruction 435 to IVR system 415 to play an announcement that may prompt calling party 130 to input an identification mechanism (e.g., a two-digit list identification) for a person or group that calling party 130 wishes to dial with the OSR service. IVR system 415 may play an announcement 440 (e.g., requesting an identification mechanism) for calling party 130 (e.g., via user agent device 405), and calling party 130 may provide input information 445 (e.g., a list identification) to IVR system 415 (e.g., via user agent device 405). IVR system 415 may provide input information 445 to user agent server 410. If calling party 130 enters a valid list identification 445 (e.g., via user agent device 405), user agent server 410 may originate simultaneous called party requests 450 to multiple destinations (e.g., user agent devices 405-1 and 405-2, user devices 105-1 and 105-2, etc.) associated with input information 445. For example, if calling party 130 enters input information 445 associated with a friend named John, user agent server 410 may provide called party requests 450 to redirect/proxy server 420 to simultaneously initiate calls to John's work telephone number, home telephone number, and/or cell telephone number.

Redirect/proxy server 420 may route called party requests 450 based on locations of termination endpoints, and may alert (or ring) the terminating endpoints (e.g., a VoIP telephone, a PC soft client, a POTS telephone, etc.). For example, redirect/proxy server 420 may send called party requests 450 to user agent devices 405-1 and 405-2, and may send, via PSTN gateway 425 and/or PSTN network 430, called party requests 450 to user devices 105-1 and 105-2. If the called party (e.g., John) answers one of user agent devices 405-1 and 405-2, and/or user devices 105-1 and 105-2, the answering destination (e.g., user agent device 405-1, as shown in FIG. 4) associated with the called party may forward an answer 455 to redirect/proxy server 420. Redirect/proxy server 420 may forward answer 455 to user agent server 410, and user agent server 410 may send answer 455 to user agent device 405. User agent device 405 may use information contained in answer 455 (e.g., an IP address associated with user agent device 405-1) to establish a two-way speech path 460 with user agent device 405-1. User agent server 410 may send a termination request (e.g., via redirect/proxy server 420) to the non-answering destinations (e.g., user agent device 405-2 and user devices 105-1 and 105-2) that may instruct the non-answering destinations to discontinue alerting and/or ringing.

If simultaneous called party requests 450 are not answered by user agent devices 405-1 and 405-2 and user devices 105-1 and 105-2 after a number of rings or encounter busy lines, user agent server 410 may execute an action defined (e.g., in the called party database) for a "no-answer" condition or a "busy" condition. For example, user agent server 410 may forward the call to voice mail if the call was not answered after a predefined number of rings. In another example, user agent server 410 may continue to ring the other telephone numbers associated with input information 445 if one of the lines is busy.

Figure 5:
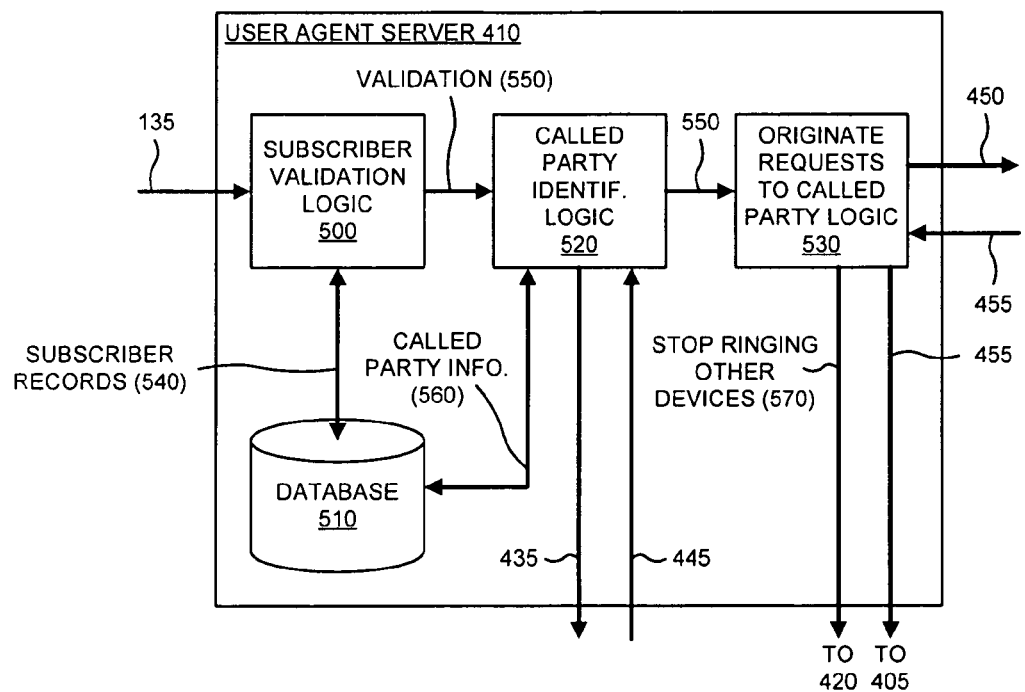
FIG. 5 depicts an exemplary functional block diagram of a user agent server of the network illustrated in FIG. 4.

FIG. 5 depicts an exemplary functional block diagram of user agent server 410. As illustrated, user agent server 410 may include subscriber validation logic 500, a database 510, called party identification logic 520, and/or originate requests to called party logic 530.

Subscriber validation logic 500 may include any hardware and/or software based logic that enables user agent server 410 to compare access code 135 (or information contained in a request) to a database of subscriber records (e.g., contained in database 510) to verify or validate that calling party 130 subscribes to the OSR service. In one implementation, subscriber validation logic 500 may receive access code 135 from user agent device 405, and may compare access code 135 to subscriber records 540 (e.g., a list of access codes for subscribers to the OSR service) provided in database 510 in order to validate that calling party subscribes to the OSR service. If access code 135 matches an access code provided in the list of access codes, subscriber validation logic 500 may determine that calling party 130 is validated, and may provide a validation 550 of calling party 130 to called party identification logic 520.

Database 510 may include one or more databases capable of being provided in user agent server 410 (e.g., within a storage device) and/or managed by user agent server 410. In one implementation, database 220 may be provided in a device separate from user agent server 410, and may be accessed by user agent server 410. The information provided in database 510 may be provided by any device in network 100, and/or by any device provided in a network separate from network 100. Database 510 may include a variety of information, such as subscriber records to verify or validate that calling party 130 subscribes to the OSR service, a list of access codes for subscribers to the OSR service, names of people that may be called by calling party 130 using the OSR service, identification mechanisms associated with the names, multiple telephone numbers associated with the names, "no-answer" conditions associated with the names, "busy" conditions associated with the names, etc.

Called party identification logic 520 may include any hardware and/or software based logic that enables user agent server 410 to retrieve records associated with calling party 130. In one implementation, called party identification logic 520 may receive validation 550, and may retrieve called party information 560 (e.g., names of people that may be called by calling party 130 using the OSR service, identification mechanisms associated with the names, multiple telephone numbers associated with the names, "no-answer" conditions associated with the names, "busy" conditions associated with the names, etc.) from database 510. Called party identification logic 520 may provide announcement instruction 435 to IVR system 415, and may receive input information 445 (e.g., a list identification) from IVR system 415. If calling party 130 enters a valid list identification 445, called party identification logic 520 may provide validation 550 to logic 530.

Originate requests to called party logic 530 may include any hardware and/or software based logic that enables user agent server 410 to originate simultaneous requests 450 to multiple destinations associated with input information 445. In one implementation, originate requests to called party logic 530 may receive validation 550 from called party identification logic 230. If calling party 130 enters a valid list identification 155, originate requests to called party logic 530 may provide called party requests 450 to redirect/proxy server 420 to simultaneously initiate calls and/or requests to multiple destinations. If the called party answers at one of the destinations, the answering destination may forward answer 455 to redirect/proxy server 420. In response, redirect/proxy server 420 may forward answer 455 to originate requests to called party logic 530, and originate requests to called party logic 530 may send answer 455 to user agent device 405. Originate requests to called party logic 530 may also send a termination request (e.g., via redirect/proxy server 420) to the non-answering destinations that instructs the non-answering destinations to discontinue alerting and/or ringing, as indicated by reference number 570.

Although FIG. 5 shows exemplary functional components of user agent server 410, in other implementations, user agent server 410 may contain fewer, different, or additional functional components than depicted in FIG. 5. In still other implementations, one or more functional components of user agent server 410 may perform one or more other tasks described as being performed by one or more other functional components of user agent server 410.

Figure 6:
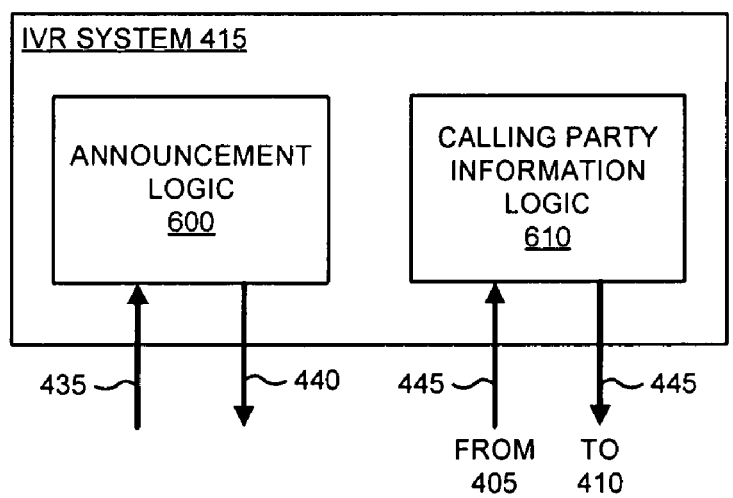
FIG. 6 illustrates an exemplary functional block diagram of an interactive voice response (IVR) system of the network depicted in FIG. 4.

FIG. 6 illustrates an exemplary functional block diagram of IVR system 415. As illustrated, IVR system 415 may include announcement logic 600 and/or calling party information logic 610.

Announcement logic 600 may include any hardware and/or software based logic that enables IVR system 415 to play an announcement that may prompt calling party 130 to input an identification mechanism (e.g., a two-digit list identification) for a person or group that calling party 130 wishes to dial with the OSR service. In one implementation, announcement logic 600 may receive instruction 435 to play an announcement that may prompt calling party 130 to input an identification mechanism for a person or group calling party 130 wishes to dial with the OSR service. Announcement logic 600 may play announcement 440 (e.g., requesting an identification mechanism) for calling party 130 (e.g., via user agent device 405).

Calling party information logic 610 may include any hardware and/or software based logic that enables IVR system 415 to provide input information 445 (e.g., in response to announcement 440) to user agent server 410. In one implementation, calling party information logic 610 may receive input information 445 (e.g., a list identification) from user agent device 405 (e.g., in response to announcement 440), and may provide input information 445 to user agent server 410.

Although FIG. 6 shows exemplary functional components of IVR system 415, in other implementations, IVR system 415 may contain fewer, different, or additional functional components than depicted in FIG. 6. In still other implementations, one or more functional components of IVR system 415 may perform one or more other tasks described as being performed by one or more other functional components of IVR system 415.

Figure 7:
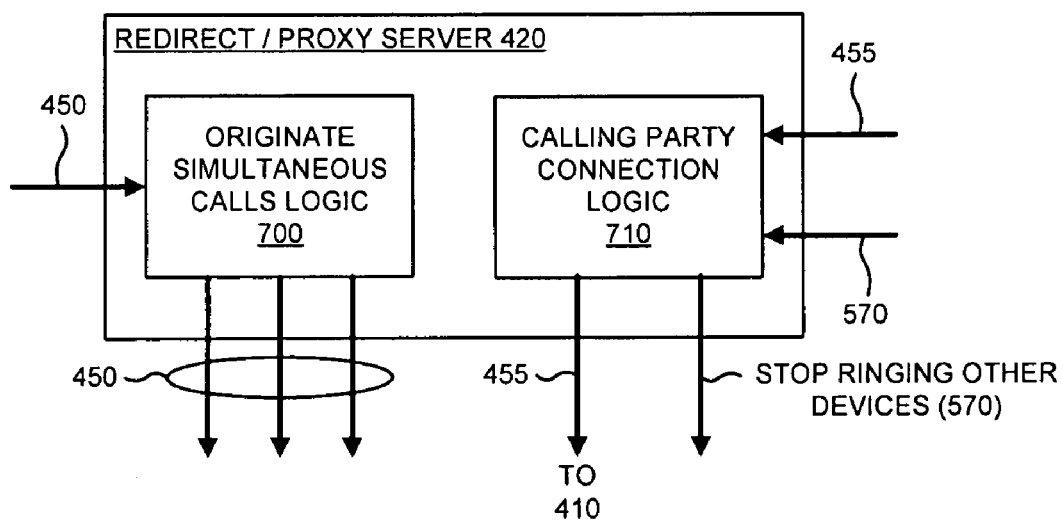
FIG. 7 depicts an exemplary functional block diagram of a redirect and/or proxy server of the network illustrated in FIG. 4.

FIG. 7 depicts an exemplary functional block diagram of a redirect/proxy server 420. As illustrated, redirect/proxy server 420 may include originate simultaneous calls logic 700 and/or calling party connection logic 710.

Originate simultaneous calls logic 700 may include any hardware and/or software based logic that enables redirect/proxy server 420 to route called party requests 450 based on locations of termination endpoints, and may alert (or ring) the terminating endpoints (e.g., a VoIP telephone, a PC soft client, a POTS telephone, etc.). In one implementation, originate simultaneous calls logic 700 may receive called party requests 450, and may originate simultaneous called party requests 450 to multiple destinations, such as user agent devices 405-1 and 405-2, and user devices 105-1 and 105-2 (e.g. via PSTN gateway 425 and/or PSTN network 430).

Calling party connection logic 710 may include any hardware and/or software based logic that enables redirect/proxy server 420 (e.g., via user agent server 410) to connect calling party 130 (e.g., via user agent device 405) to a destination answering one of the simultaneous calls. In one implementation, if the called party answers one of user agent devices 405-1 and 405-2, and/or user devices 105-1 and 105-2, the answering destination associated with the called party may forward answer 455 to calling party connection logic 710. Calling party connection logic 710 may forward answer 455 to user agent server 410 so that two-way speech path 460 may be established. Calling party connection logic 710 may receive alert/ringing termination request 570 from user agent server 410, and may send alert/ringing termination request 570, to the non-answering destinations (e.g., user agent device 405-2 and user devices 105-1 and 105-2), in order to instruct the non-answering destinations to discontinue alerting and/or ringing.

Although FIG. 7 shows exemplary functional components of redirect/proxy server 420, in other implementations, redirect/proxy server 420 may contain fewer, different, or additional functional components than depicted in FIG. 7. In still other implementations, one or more functional components of redirect/proxy server 420 may perform one or more other tasks described as being performed by one or more other functional components of redirect/proxy server 420.

Figure 8:
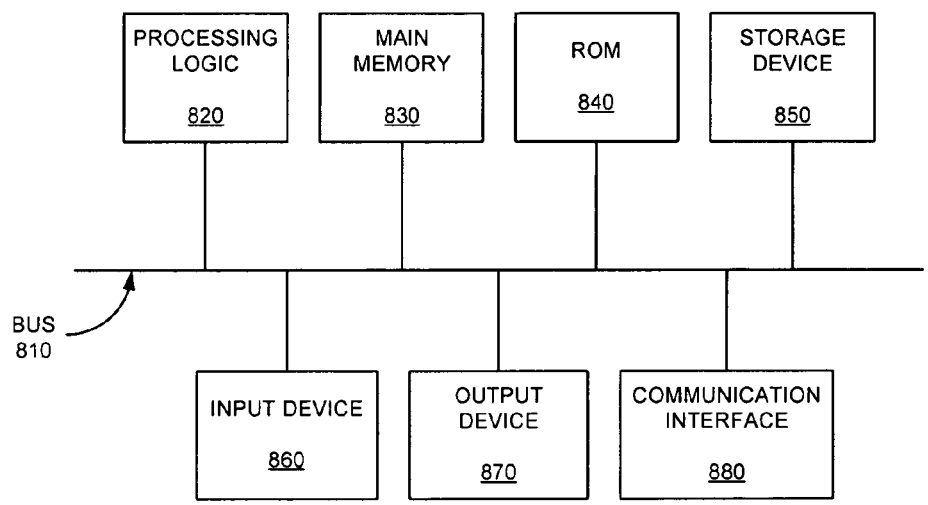
FIG. 8 illustrates exemplary components of a user device, a service switching point, the service control point, the intelligent peripheral, a user agent device, the user agent server, the IVR system, the redirect/proxy server, and/or a Public Switched Telephone Network (PSTN) gateway of the networks depicted in FIGS. 1 and 4.

FIG. 8 is an exemplary diagram of a device 800 that may correspond to user devices 105, SSP 110, SCP 115, intelligent peripheral 120, user agent devices 405, user agent server 410, IVR system 415, redirect/proxy server 420, and/or PSTN gateway 425. As illustrated, device 800 may include a bus 810, processing logic 820, a main memory 830, a read-only memory (ROM) 840, a storage device 850, an input device 860, an output device 870, and/or a communication interface 880. The functions described in FIGS. 2, 3, and 5-7 may be performed by one or more of the exemplary components of device 800 depicted in FIG. 8.

Bus 810 may include a path that permits communication among the components of device 800. Processing logic 820 may include a processor, microprocessor, or other type of processing logic that may interpret and execute instructions. Main memory 830 may include a random access memory (RAM) or another type of dynamic storage device that may store information and instructions for execution by processing logic 820. ROM 840 may include a ROM device or another type of static storage device that may store static information and/or instructions for use by processing logic 820. Storage device 850 may include a magnetic and/or optical recording medium and its corresponding drive.

Input device 860 may include a mechanism that permits an operator to input information to device 800, such as a keyboard, a mouse, a pen, a microphone, a touch screen, voice recognition and/or biometric mechanisms, etc. Output device 870 may include a mechanism that outputs information to the operator, including a display, a printer, a speaker, etc. Communication interface 880 may include any transceiver-like mechanism that enables device 800 to communicate with other devices and/or systems. For example, communication interface 880 may include mechanisms for communicating with another device or system via a network, such as networks 100 and/or 400.

As described herein, device 800 may perform certain operations in response to processing logic 820 executing software instructions contained in a computer-readable medium, such as main memory 830. A computer-readable medium may be defined as a physical or logical memory device. The software instructions may be read into main memory 830 from another computer-readable medium, such as storage device 850, or from another device via communication interface 880. The software instructions contained in main memory 830 may cause processing logic 820 to perform processes described herein. Alternatively, hardwired circuitry may be used in place of or in combination with software instructions to implement processes described herein. Thus, implementations described herein are not limited to any specific combination of hardware circuitry and software.

Although FIG. 8 shows exemplary components of device 800, in other implementations, device 800 may contain fewer, different, or additional components than depicted in FIG. 8. In still other implementations, one or more components of device 800 may perform one or more other tasks described as being performed by one or more other components of device 800.

FIG. 9 depicts a portion 900 of an exemplary calling party database capable of being provided in and/or managed by SCP 115 and/or user agent server 410. In one implementation, the information provided in database portion 900 may be provided by any device in networks 100 and/or 400, and may be used by any device of networks 100 and/or 400.

As illustrated, database portion 900 may include a variety of information associated with a calling party (e.g., calling party 130) that may be used to originate simultaneous calls and/or requests to multiple destinations associated with a called party. For example, database portion 900 may include a list name field 910, a list identification (ID) field 920, a first phone number field 940, additional phone number fields 950, a last phone number field 950, a no-answer condition field 960, a busy condition field 970, and a variety of records or entries 980 associated with fields 910-970.

List name field 910 may include names of called parties that may receive simultaneous calls and/or requests at multiple destinations. For example, a first entry 980 may include a name "John" under list name field 910, a second entry 980 may include a name "Dad" under list name field 910, a third entry 980 may include a name "My Employee" under list name field 910, and a fourth entry 980 may include a name "Assistants" under list name field 910.

List ID field 920 may include identification mechanisms (e.g., associated with corresponding names of list name field 910) that may be input by calling party 130 to identify which called party is to receive simultaneous calls and/or requests at multiple destinations. For example, a first entry 980 may include a number "01" under list ID field 920 (e.g., which may correspond to "John"), a second entry 980 may include a number "02" under list ID field 920 (e.g., which may correspond to "Dad"), a third entry 980 may include a number "03" under list ID field 920 (e.g., which may correspond to "My Employee"), and a fourth entry 980 may include a number "04" under list ID field 920 (e.g., which may correspond to "Assistants").

First, additional, and last phone number fields 930-950 may include telephone numbers of multiple destinations (e.g., user devices 105, user agent devices 405, etc.) that may receive simultaneous calls and/or requests. The telephone numbers provided in phone number fields 930-950 may be associated with corresponding names of list name field 910. An amount of phone number fields 930-950 may depend on an amount of destinations to be provided by the OSR service. Furthermore, each entry in list name field 910 may include more, less, and/or different telephone numbers than other entries in list name field 910 (e.g., "John" may include five telephone numbers, and "Dad" may include three telephone numbers). In one example, entries 980 of phone number fields 930-950 may include a ten-digit format (e.g., "NPA-NXX-XXXX").

No-answer condition field 960 may include actions to be executed (e.g., by the OSR service) if a call to multiple destinations is not answered (e.g., after a certain amount of rings). For example, a first entry 980 and a fourth entry 980 may include an action "Voice mail" under no-answer condition field 960. This may indicate that an unanswered call should be sent to voice mail for "John" and "Assistants." A second entry 980 may include an action "Email" under no-answer condition field 960, which may indicate that an email should sent to "Dad" if the call is not answered. A third entry 980 may include an action "Text Message" under no-answer condition field 960, which may indicate that a text message should be sent to "My Employee" if the call is not answered.

Busy condition field 970 may include actions to be executed (e.g., by the OSR service) if a call to multiple destinations encounters busy lines. For example, a first entry 980 may include an action "Try again" under busy condition field 970, which may indicate that the call should be tried again to "John" if a busy line is encountered. A second entry 980 may include an action "Email" under busy condition field 970, which may indicate that an email should be sent to "Dad" if a busy line is encountered. A third entry 980 may include an action "Pager" under busy condition field 970, which may indicate that "My Employee" should be paged if a busy line is encountered. A fourth entry 980 may include an action "Voice mail" under busy condition field 970, which may indicate that a voice mail should be sent to "Assistants" if a busy line is encountered.

Although FIG. 9 shows exemplary information that may be provided in database portion 900, in other implementations, database portion 900 may contain fewer, different, or additional information than depicted in FIG. 9.

In one exemplary implementation, user agent server 410 may include a user interface that provides for display, to calling party 130 (e.g., via user agent device 405), a calling party database similar to database portion 900. The user interface may include a graphical user interface (GUI), a non-graphical user interface (e.g., a text-based interface), a web-based user interface, etc. The user interface may provide information to users (e.g., calling party 130) via a customized interface (e.g., a proprietary interface) and/or other types of interfaces (e.g., a browser-based interface). The user interface may receive user inputs via one or more input devices (e.g., input device 860), may be user configurable (e.g., a user may change the size of the user interface, information displayed in the user interface, color schemes used by the user interface, positions of text, images, icons, windows, etc., in the user interface, etc.), and/or may not be user configurable. The user interface may be displayed to a user via one or more output devices (e.g., output device 270). In one example, the user interface (e.g., database portion 900) may be displayed to calling party 130 (e.g., via user agent device 405), and calling party 130 may select one of the names (e.g., "John") from list name field 910. The OSR service may generate simultaneous calls and/or requests to multiple destinations (e.g., the telephone numbers provided in phone number fields 930-950) associated with the selected name. In another example, the user interface may enable the calling party 130 to manage (e.g., edit, create, delete, etc.) entries provided in calling party database 900.

Figure 10:
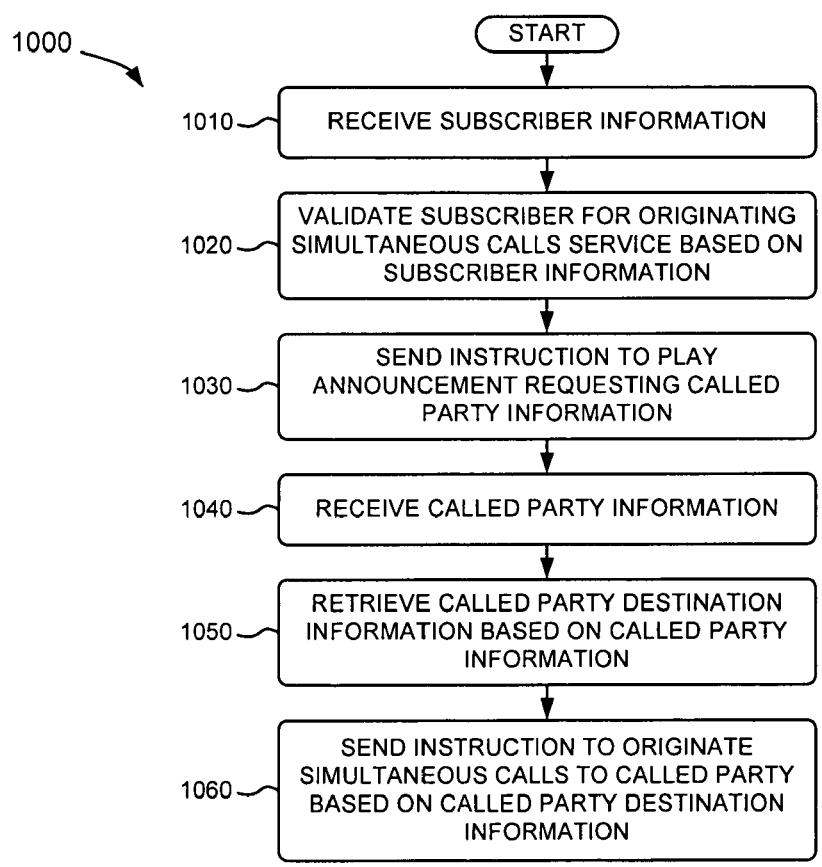
FIGS. 10-14B illustrate flow charts of exemplary processes according to implementations described herein.

FIG. 10 depicts a flow chart of an exemplary process 1000 for originating simultaneous calls to a called party according to implementations described herein. In one implementation, process 1000 may be performed by SCP 115 and/or user agent server 410. In another implementation, some or all of process 1000 may be performed by another device or group of devices, including or excluding SCP 115 and/or user agent server 410.

As illustrated in FIG. 10, process 1000 may begin with receipt of subscriber information (block 1010), and validation of a subscriber for an originating of simultaneous calls service (e.g., the OSR service) based on the subscriber information (block 1020). For example, in implementations described above in connection with FIG. 1, calling party 130 may dial access code 135 (or use some other verification mechanism, such as voice recognition) via his/her user device 105. User device 105 may provide access code 135 to SSP 110. SSP 110 may provide access code 135 and/or query 140 to SCP 115 for validation/execution. SCP 115 may receive access code 135 and/or query 140, and may execute query 140 on a database of subscriber records to verify or validate that calling party 130 subscribes to the OSR service. In one example, the database of subscriber records may include a list of access codes for subscribers to the OSR service. If access code 135 matches an access code provided in the list of access codes, SCP 115 may validate calling party 130 and may retrieve records associated with calling party 130.

As further shown in FIG. 10, an instruction to play an announcement requesting called party information may be sent (block 1030), and called party information may be received (block 1040). For example, in implementations described above in connection with FIG. 1, SCP 115 may provide instruction 145 to intelligent peripheral 120 to play an announcement that may prompt calling party 130 to input an identification mechanism (e.g., a two-digit list identification, a name, etc.) for a person or group that calling party 130 wishes to dial with the OSR service. Intelligent peripheral 120 may play an announcement 150 (e.g., requesting an identification mechanism) for calling party 130 (e.g., via user device 105), and, in response, calling party 130 may provide input information 155 (e.g., a list identification) to intelligent peripheral 120 (e.g., via user device 105). Intelligent peripheral 120 may provide input information 155 to SCP 115.

Returning to FIG. 10, called party destination information may be retrieved based on the received called party information (block 1050), and an instruction to generate simultaneous calls to the called party may be sent based on the called party destination information (block 1060). For example, in implementations described above in connection with FIG. 1, if calling party 130 enters a valid list identification 155 (e.g., via user device 105), SCP 115 may retrieve called party destination information (e.g., one or more telephone numbers) based on input information 155, and may provide instruction 165 to intelligent peripheral 120 to simultaneously initiate a call to each telephone number associated with input information 155.

Figure 11:
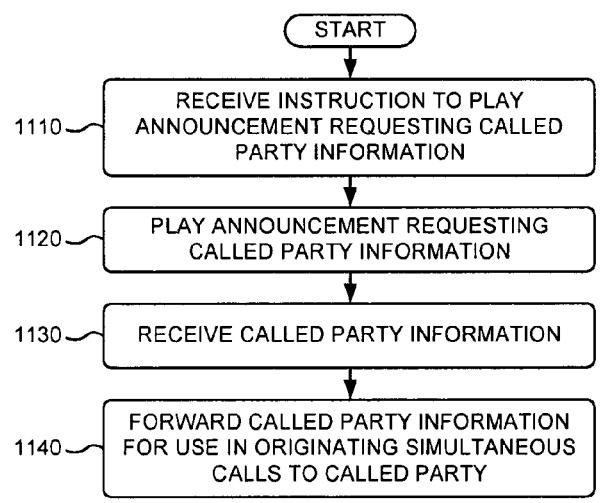

FIG. 11 depicts a flow chart of an exemplary process 1100 for retrieving called party information according to implementations described herein. In one implementation, process 1100 may be performed by intelligent peripheral 120 and/or IVR system 415. In another implementation, some or all of process 1100 may be performed by another device or group of devices, including or excluding intelligent peripheral 120 and/or IVR system 415.

As illustrated in FIG. 11, process 1100 may begin with receipt of an instruction to play an announcement requesting called party information (block 1110), and playing the announcement requesting the called party information (block 1120). For example, in implementations described above in connection with FIG. 4, user agent server 410 may provide instruction 435 to IVR system 415 to play an announcement that may prompt calling party 130 to input an identification mechanism (e.g., a two-digit list identification) for a person or group that calling party 130 wishes to dial with the OSR service. IVR system 415 may play announcement 440 (e.g., requesting an identification mechanism) for calling party 130 (e.g., via user agent device 405).

As further shown in FIG. 11, the called party information may be received (block 1130), and the called party information may be forwarded for use in originating simultaneous calls to the called party (block 1140). For example, in implementations described above in connection with FIG. 4, calling party 130 may provide input information 445 (e.g., a list identification) to IVR system 415 (e.g., via user agent device 405) in response to announcement 440, and IVR system 415 may provide input information 445 to user agent server 410.

Figure 12:
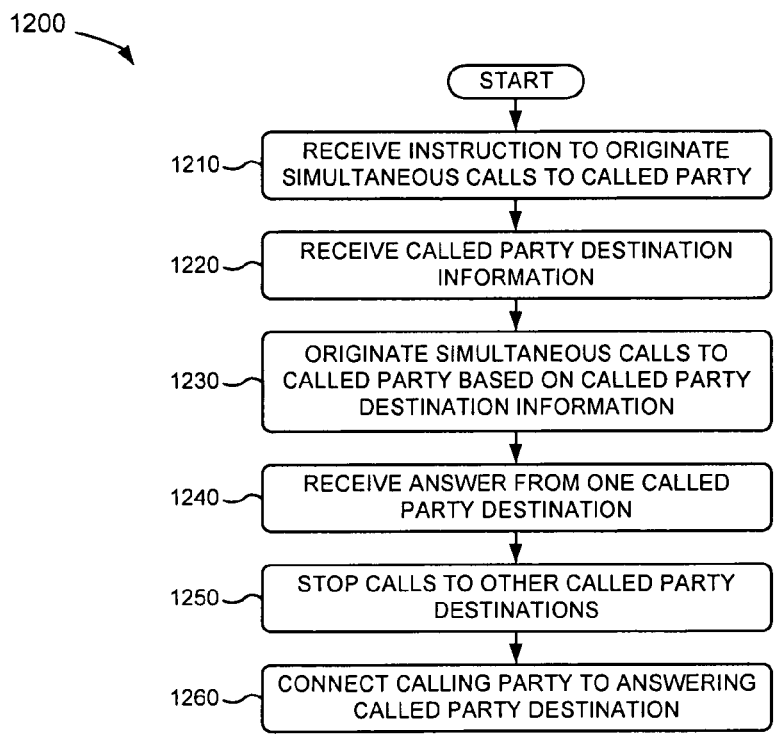

FIG. 12 depicts a flow chart of an exemplary process 1200 for originating simultaneous calls to a called party according to implementations described herein. In one implementation, process 1200 may be performed by intelligent peripheral 120 and/or redirect/proxy server 420. In another implementation, some or all of process 1200 may be performed by another device or group of devices, including or excluding intelligent peripheral 120 and/or redirect/proxy server 420.

As illustrated in FIG. 12, process 1200 may begin with receipt of an instruction to originate simultaneous calls to the called party (block 1210), and receipt of called party destination information (block 1220). For example, in implementations described above in connection with FIG. 1, if calling party 130 enters a valid list identification 155 (e.g., via user device 105), SCP 115 may route calling party 130 to intelligent peripheral 120, as indicated by reference number 160, and may provide instruction 165 to intelligent peripheral 120 to simultaneously initiate a call to each telephone number associated with input information 155.

As further shown in FIG. 12, simultaneous calls to the called party may be originated based on the called party destination information (block 1230), and an answer may be received from one called party destination (block 1240). For example, in implementations described above in connection with FIG. 1, intelligent peripheral 120 may originate simultaneous calls 170 to multiple destinations (e.g., user devices 105-1, 105-2, and/or 105-3) associated with input information 155, and the called party (e.g., John) may answer one of user devices 105-1, 105-2, and/or 105-3.

Returning to FIG. 12, calls to other, non-answering called party destinations may be stopped (block 1250), and the calling party may be connected to the answering called party destination (block 1260). For example, in implementations described above in connection with FIG. 1, if the called party (e.g., John) answers one of user devices 105-1, 105-2, and/or 105-3, intelligent peripheral 120 may stop ringing the non-answering user devices (e.g., two of user devices 105-1, 105-2, and/or 105-3), and may bridge calling party 130 to a destination (e.g., the answering one of user devices 105-1, 105-2, and/or 105-3) associated with the called party. A connection may be established between calling party 130 and the destination (e.g., the called party).

Figure 13A:
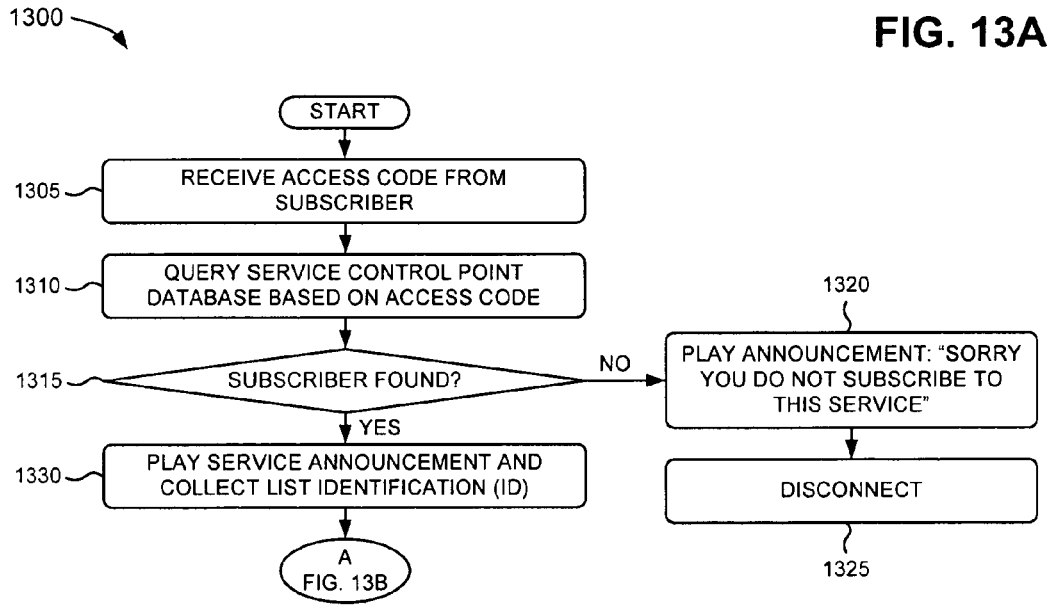
Figure 13B:
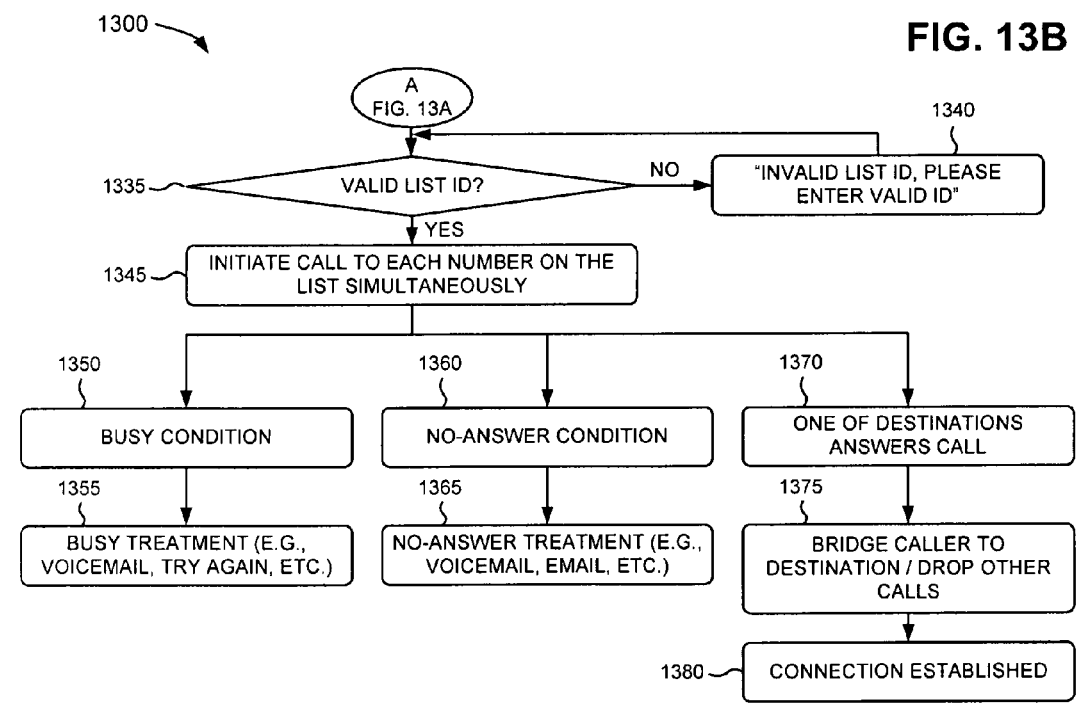

FIGS. 13A and 13B depict flow charts of an exemplary process 1300 for originating simultaneous calls for a calling party according to implementations described herein. In one implementation, process 1300 may be performed by one or more devices of network 100. In another implementation, some or all of process 1300 may be performed by another device or group of devices, including or excluding the one or more devices of network 100.

As illustrated in FIG. 13A, process 1300 may begin with receipt of an access code from a subscriber or calling party (block 1305), and querying of a service control point database based on the access code (block 1310). For example, in implementations described above in connection with FIG. 1, calling party 130 may dial an access code 135 (or use some other verification mechanism, such as voice recognition) via his/her user device 105. User device 105 may provide access code 135 to SSP 110, and SSP 110 may suspend call processing and may generate query 140 based on access code 135. SSP 110 may provide access code 135 and/or query 140 to SCP 115 for execution. SCP 115 may receive access code 135 and/or query 140, and may execute query 140 on a database of subscriber records to verify or validate that calling party 130 subscribes to the OSR service. In one example, the database of subscriber records may include a list of access codes for subscribers to the OSR service.

As further shown in FIG. 13A, if the subscriber is not found (block 1315-NO), an announcement (e.g., "Sorry, you do not subscribe to this service") may be played (block 1320) and the call may be disconnected (block 1325). For example, in one implementation, if access code 135 does not match an access code provided in the list of access codes, SCP 115 (e.g., via intelligent peripheral 120) may play an announcement (e.g., "Sorry you do not subscribe to this service"), and SCP 115 may disconnect calling party 130.

Returning to FIG. 13A, if the subscriber is found (block 1315-YES), a service announcement may be played and list identification may be collected or received (block 1330). For example, in implementations described above in connection with FIG. 1, if access code 135 matches an access code provided in the list of access codes, SCP 115 may retrieve records associated with calling party 130, and may provide instruction 145 to intelligent peripheral 120 to play an announcement that may prompt calling party 130 to input an identification mechanism (e.g., a two-digit list identification) for a person or group that calling party 130 wishes to dial with the OSR service. Intelligent peripheral 120 may play announcement 150 (e.g., requesting an identification mechanism) for calling party 130 (e.g., via user device 105), and calling party 130 may provide input information 155 (e.g., a list identification) to intelligent peripheral 120 (e.g., via user device 105). Intelligent peripheral 120 may provide input information 155 to SCP 115.

As shown in FIG. 13B, if a valid list identification is not received (block 1335-NO), a message (e.g., "Invalid list ID, please enter valid ID") may be played (block 1340) and process 1300 may return to block 1335. For example, in one implementation, if calling party 130 does not enter a valid list identification 155, SCP 115 (e.g., via intelligent peripheral 120) may play a message (e.g., "Invalid list ID, please enter valid ID"), and may request calling party 130 to input a valid list identification 155.

As further shown in FIG. 13B, if a valid list identification is received (block 1335-YES), a call may be simultaneously initiated to each number on the list (block 1345), and the calls may experience one of a busy condition (block 1350), a no-answer condition (block 1360), or one of the destinations answering the call (block 1370). For example, in one implementation described above in connection with FIG. 1, if calling party 130 enters a valid list identification 155 (e.g., via user device 105), SCP 115 may route calling party 130 to intelligent peripheral 120, as indicated by reference number 160, and may provide instruction 165 to intelligent peripheral 120 to simultaneously initiate a call to each telephone number associated with input information 155. Intelligent peripheral 120 may originate simultaneous calls 170 to multiple destinations (e.g., user devices 105-1, 105-2, and/or 105-3) associated with input information 155.

Returning to FIG. 13B, if a busy condition is encountered (block 1350) a busy condition associated with the list identification and retrieved from database 900 (e.g., go to voice mail, try again, etc.) may be executed for the call (block 1355). If a no-answer condition is encountered (block 1360), a no-answer condition associated with the list identification and retrieved from database 900 (e.g., go to voice mail, send an email, etc.) may be executed for the call (block 1365). For example, in one implementation described above in connection with FIG. 1, if simultaneous calls 170 are not answered by user devices 105-1, 105-2, and/or 105-3 after a number of rings or encounter busy lines, SCP 115 may execute an action defined (e.g., in the called party database) for a "no-answer" condition or a "busy" condition. In one example, SCP 115 may forward the call to voice mail if the call was not answered after a predefined number of rings. In another example, SCP 115 may continue to ring the other telephone numbers associated with input information 155 if one of the lines is busy.

As further shown in FIG. 13B, if one of the destinations answers the call (block 1370), the calling party may be bridged to the answering destination and the other calls may be dropped (block 1375), and a connection may be established between the calling party and the answering destination (block 1380). For example, in one implementation described above in connection with FIG. 1, if the called party answers one of user devices 105-1, 105-2, and/or 105-3, intelligent peripheral 120 may bridge calling party 130 to a destination (e.g., the answering one of user devices 105-1, 105-2, and/or 105-3) associated with the called party, and may stop ringing the non-answering user devices (e.g., two of user devices 105-1, 105-2, and/or 105-3). A connection may be established between calling party 130 and the destination (e.g., the called party).

Figure 14A:
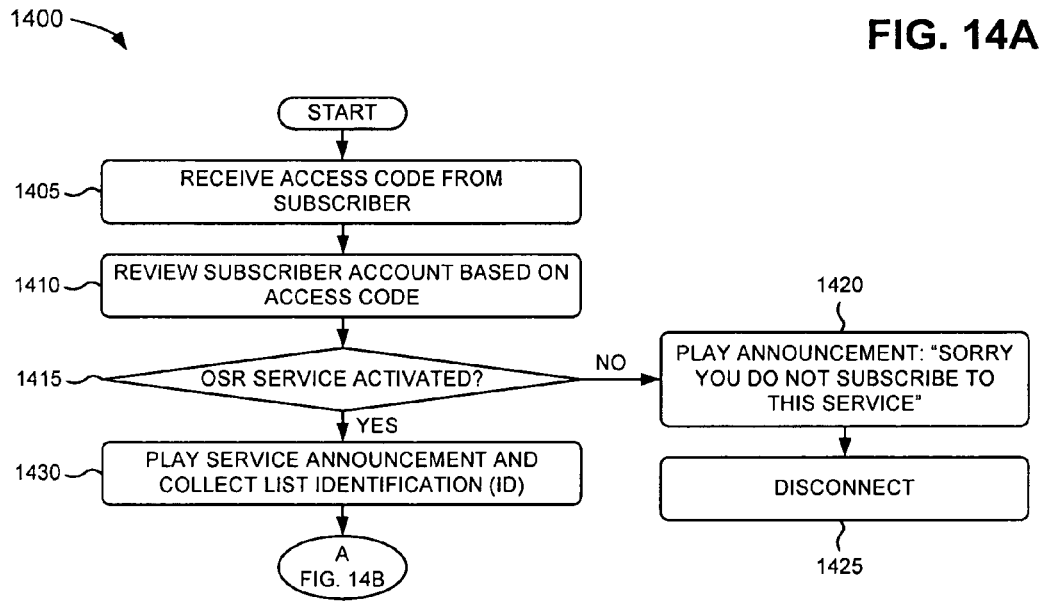

FIGS. 14A and 14B depict flow charts of an exemplary process 1400 for originating simultaneous calls for a calling party according to implementations described herein. In one implementation, process 1400 may be performed by one or more devices of network 400. In another implementation, some or all of process 1400 may be performed by another device or group of devices, including or excluding the one or more devices of network 400.

As illustrated in FIG. 14A, process 1400 may begin with receipt of an access code from a subscriber (block 1405), and review of a subscriber account based on the access code (block 1410). For example, in implementations described above in connection with FIG. 4, calling party 130 may dial access code 135 (or use some other verification mechanism, such as a username and/or password) via his/her user agent device 405. User agent server 410 may receive access code 135 and/or the request, and may determine whether the OSR service is activated for calling party 130 based on a comparison with a database of subscriber records. In one example, the database of subscriber records may include a list of access codes for subscribers to the OSR service.

As further shown in FIG. 14A, if an originating simultaneous rings (OSR) service is not activated (block 1415-NO), an announcement (e.g., "Sorry, you do not subscribe to this service") may be played (block 1420) and the called may be disconnected (block 1425). For example, in implementations described above in connection with FIG. 4, if access code 135 does not match an access code provided in the list of access codes, user agent server 410 (e.g., via IVR system 415) may play an announcement (e.g., "Sorry you do not subscribe to this service"), and user agent server 410 may disconnect calling party 130.

Returning to FIG. 14A, if the OSR service is activated (block 1415-13YES), a service announcement may be played and list identification may be collected (block 1430). For example, in implementations described above in connection with FIG. 4, if access code 135 matches an access code provided in the list of access codes, user agent server 410 may retrieve records associated with calling party 130, and may provide instruction 435 to IVR system 415 to play an announcement that may prompt calling party 130 to input an identification mechanism (e.g., a two-digit list identification) for a person or group that calling party 130 wishes to dial with the OSR service. IVR system 415 may play an announcement 440 (e.g., requesting an identification mechanism) for calling party 130 (e.g., via user agent device 405), and calling party 130 may provide input information 445 (e.g., a list identification) to IVR system 415 (e.g., via user agent device 405). IVR system 415 may provide input information 445 to user agent server 410.

As shown in FIG. 14B, if a valid list identification is not received (block 1435-NO), a message (e.g., "Invalid list ID, please enter valid ID") may be played (block 1440) and process 1400 may return to block 1435. For example, in one implementation described above in connection with FIG. 4, if calling party 130 does not enter a valid list identification 445, user agent server 410 (e.g., via IVR system 415) may play a message (e.g., "Invalid list ID, please enter valid ID"), and may request calling party 130 to input a valid list identification 445.

As further shown in FIG. 14B, if a valid list identification is received (block 1435-YES), a call may be simultaneously initiated to each number on the list (block 1445), and the calls may experience one of a busy condition (block 1450), a no-answer condition (block 1460), or one of the destinations answering the call (block 1470). For example, in one implementation described above in connection with FIG. 4, if calling party 130 enters a valid list identification 445 (e.g., via user agent device 405), user agent server 410 may originate simultaneous called party requests 450 to multiple destinations (e.g., user agent devices 405-1 and 405-2, user devices 105-1 and 105-2, etc.) associated with input information 445. Redirect/proxy server 420 may route called party requests 450 based on locations of termination endpoints, and may alert (or ring) the terminating endpoints (e.g., a VoIP telephone, a PC soft client, a POTS telephone, etc.). In one example, redirect/proxy server 420 may send called party requests 450 to user agent devices 405-1 and 405-2, and may send, via PSTN gateway 425 and/or PSTN network 430, called party requests 450 to user devices 105-1 and 105-2.

Returning to FIG. 14B, if a busy condition is encountered (block 1450) a busy condition associated with the list identification and retrieved from database 900 (e.g., go to voice mail, try again, etc.) may be executed for the call (block 1455). If a no-answer condition is encountered (block 1460), a no-answer condition associated with the list identification and retrieved from database 900 (e.g., go to voice mail, send an email, etc.) may be executed for the call (block 1465). For example, in one implementation described above in connection with FIG. 4, if simultaneous called party requests 450 are not answered by user agent devices 405-1 and 405-2 and user devices 105-1 and 105-2 after a number of rings or encounter busy lines, user agent server 410 may execute an action defined (e.g., in the called party database) for a "no-answer" condition or a "busy" condition. In one example, user agent server 410 may forward the call to voice mail if the call was not answered after a predefined number of rings. In another example, user agent server 410 may continue to ring the other telephone numbers associated with input information 445 if one of the lines is busy.

As further shown in FIG. 14B, if one of the destinations answers the call (block 1470), a response from the answering destination may be forwarded to the calling party and the other calls may be terminated (block 1475), and a two-way speech path may be established between the calling party and the answering destination (block 1480). For example, in one implementation described above in connection with FIG. 4, if the called party answers one of user agent devices 405-1 and 405-2, and/or user devices 105-1 and 105-2, the answering destination (e.g., user agent device 405-1) associated with the called party may forward answer 455 to redirect/proxy server 420. Redirect/proxy server 420 may forward answer 455 to user agent server 410, and user agent server 410 may send answer 455 to user agent device 405. User agent device 405 may use information contained in answer 455 (e.g., an IP address associated with user agent device 405-1) to establish a two-way speech path 460 with user agent device 405-1. User agent server 410 may send a termination request (e.g., via redirect/proxy server 420) to the non-answering destinations that may instruct the non-answering destinations to discontinue alerting and/or ringing.

Implementations described herein may provide an originating simultaneous ring (OSR) service that enables a calling party to dial multiple telephone numbers simultaneously and to connect to a first destination that answers the call. The OSR service may aid a calling party that has multiple contact telephone numbers for the same person, and may permit the calling party to create a profile with lists of telephone numbers, and to assign a list name and an identification mechanism to each list.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-14B, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computing device, information associated with a calling party;
   validating, by the computing device, the calling party for an originating simultaneous calls service based on the calling party information;

receiving, by the computing device, information associated with a called party;

retrieving, by the computing device, called party destination information based on the called party information;

sending, by the computing device, an instruction to originate two or more simultaneous calls to the called party based on the called party destination information;

receiving, by the computing device, an answer, to one of the two or more simultaneous calls, from a called party destination; and terminating, by the computing device, the other of the two or more simultaneous calls after receiving the answer.

2. The computing-device implemented method of claim 1, further comprising:

sending an instruction to play an announcement requesting the called party information; and receiving the called party information from the calling party in response to based on the announcement.

3. The computing device-implemented method of claim 1, further comprising:

connecting a device of the calling party to the answering called party destination.

4. The computing device-implemented method of claim 1, further comprising:

receiving a busy condition from called party destinations; and executing a busy condition treatment for the calls to the called party, where the busy condition treatment is defined in the called party destination information.

5. The computing device-implemented method of claim 4, where executing a busy condition treatment comprises one or more of:

leaving a voice mail for the called party;
sending an email to the called party;
paging the called party;
sending a text message to the called party; or
re-trying the two or more simultaneous calls to the called party based on the called party destination information.

6. The computing device-implemented method of claim 1, further comprising:

receiving a no-answer condition from called party destinations; and executing a no-answer condition treatment for the calls to the called party, where the no-answer condition treatment is defined in the called party destination information.

7. The computing device-implemented method of claim 6, where executing a no-answer condition treatment comprises one or more of:

leaving a voice mail for the called party;
sending an email to the called party;
paging the called party;
sending a text message to the called party; or
re-trying the two or more simultaneous calls to the called party based on the called party destination information.

8. A computing device-implemented method, comprising:

receiving, by the computing device, an instruction to originate two or more simultaneous calls to a called party;

receiving, by the computing device, called party destination information;

originating, by the computing device, the two or more simultaneous calls to the called party based on the called party destination information;

receiving, by the computing device, an answer, to one of the two or more simultaneous calls, from a called party destination; and terminating, by the computing device, the other of the two or more simultaneous calls after receiving the answer.

9. The computing device-implemented method of claim 8, further comprising:

connecting a device of the calling party to the answering called party destination.

10. The computing device-implemented method of claim 8, further comprising:

receiving a busy condition from called party destinations; and executing a busy condition treatment for the calls to the called party.

11. The computing device-implemented method of claim 10, where executing a busy condition treatment comprises one or more of:

leaving a voice mail for the called party;
sending an email to the called party;
paging the called party;
sending a text message to the called party; or
re-trying the two or more simultaneous calls to the called party based on the called party destination information.

12. The computing device-implemented method of claim 8, further comprising:

receiving a no-answer condition from called party destinations; and executing a no-answer condition treatment for the calls to the called party.

13. The computing device-implemented method of claim 12, where executing a no-answer condition treatment comprises one or more of:

leaving a voice mail for the called party;
sending an email to the called party;
paging the called party;
sending a text message to the called party; or
re-trying the two or more simultaneous calls to the called party based on the called party destination information.

14. A device, comprising:

processing logic to:
  receive information associated with a calling party,
  validate the calling party for an originating simultaneous calls service based on the calling party information,
  receive the called party information from the calling party,
  retrieve called party destination information based on the called party information,
  send an instruction to originate two or more simultaneous calls to the called party based on the called party destination information,
  receive an answer, to one of the two or more simultaneous calls, from a called party destination; and
  terminate the other of the two or more simultaneous calls after receiving the answer.

15. The device of claim 14, where the calling party information comprises an access code associated with the calling party, and the processing logic is further to:

compare the access code to a database of access codes associated with the originating simultaneous calls service; and validate the calling party if the access code matches one of the access codes contained in the database.

16. The device of claim 14, where the called party information comprises an identifier of the called party, and the processing logic is further to:

compare the called party identifier to a calling party database; and retrieve the called party destination information from the calling party database based on the comparison.

17. The device of claim 16, where the calling party database comprises at least one of:
- one or more names of people capable of being called by the calling party using the originating simultaneous calls service;
- one or more identification mechanisms associated with the one or more names;
- one or more telephone numbers associated with the one or more names;
- one or more no-answer conditions associated with the one or more names; or
- one or more busy conditions associated with the one or more names.

18. The device of claim 14, where the called party destination information comprises one or more telephone numbers associated with the called party.

19. The device of claim 14, where the processing logic is further to:
- connect a device of the calling party to the answering called party destination.

20. The device of claim 14, where the processing logic is further to:
- receive a busy condition from called party destinations; and
- execute a busy condition treatment for the calls to the called party.

21. The device of claim 20, where, when executing the busy condition treatment, the processing logic is further to one of:
- leave a voice mail for the called party;
- send an email to the called party;
- page the called party;
- send a text message to the called party; or
- re-try the two or more simultaneous calls to the called party based on the called party destination information.

22. The device of claim 14, where the processing logic is further to:
- receive a no-answer condition from called party destinations; and
- execute a no-answer condition treatment for the calls to the called party.

23. The device of claim 14, where, when executing the no-answer condition treatment, the processing logic is further to one of:
- leave a voice mail for the called party;
- send an email to the called party;
- page the called party;
- send a text message to the called party; or
- re-try the two or more simultaneous calls to the called party based on the called party destination information.

24. The device of claim 14, where the device comprises at least one of:
- a service switching point;
- a service control point;
- an intelligent peripheral;
- a user agent server;
- an interactive voice response system;
- a redirect server; or
- a proxy server.

25. A system, comprising:
- means for receiving information associated with a calling party;
- means for validating the calling party for an originating simultaneous calls service based on the calling party information;
- means for receiving the called party information from the calling party;
- means for retrieving called party destination information based on the called party information;
- means for sending an instruction to originate two or more simultaneous calls to the called party based on the called party destination information;
- means for receiving an answer, to one of the two or more simultaneous calls, from a called party destination;
- means for terminating the other of the two or more simultaneous calls after receiving the answer; and
- means for connecting a device of the calling party to the answering called party destination.

\* \* \* \* \*